United States Patent [19]

Imataki

[11] Patent Number: 5,249,176
[45] Date of Patent: Sep. 28, 1993

[54] OPTICAL RECORDING MEDIUM, PROCESS FOR PREPARING THE SAME AND ITS OPTICAL RECORDING AND REPRODUCING SYSTEM

[75] Inventor: Hiroyuki Imataki, Kawasaki, Japan

[73] Assignee: Canon Kabushiki Kaisha, Tokyo, Japan

[21] Appl. No.: 825,403

[22] Filed: Jan. 24, 1992

Related U.S. Application Data

[63] Continuation of Ser. No. 216,020, Jul. 7, 1988, abandoned.

[30] Foreign Application Priority Data

Jul. 20, 1987 [JP] Japan .................. 62-179127

[51] Int. Cl.⁵ .................................. G11B 3/70
[52] U.S. Cl. .................................. 369/283; 369/288; 360/133; 360/135
[58] Field of Search .................. 369/272–274, 369/275.5, 283, 288, 292; 360/133, 135

[56] References Cited

U.S. PATENT DOCUMENTS

| | | | |
|---|---|---|---|
| 3,805,292 | 4/1974 | Hashiguchi et al. | 360/135 |
| 4,127,872 | 11/1978 | Lo | 369/283 X |
| 4,268,575 | 5/1981 | Shinozaki et al. | 369/283 X |
| 4,363,844 | 12/1982 | Lewis et al. | 428/65 |
| 4,510,593 | 4/1985 | Daniels | 369/283 |
| 4,516,678 | 4/1985 | Fotiadis et al. | 360/133 X |
| 4,554,655 | 11/1985 | Kumasaka et al. | 369/283 X |
| 4,573,097 | 2/1986 | Pastor et al. | 360/135 |
| 4,623,570 | 11/1986 | Alexander et al. | 360/135 X |
| 4,625,384 | 12/1986 | Gerfast | 360/135 X |
| 4,707,431 | 11/1987 | Umehara | 369/283 X |
| 4,737,444 | 4/1988 | Satoh et al. | 369/283 X |
| 4,835,647 | 5/1989 | Chernega et al. | 360/135 |
| 4,866,672 | 8/1989 | Terao et al. | 369/283 X |
| 4,871,601 | 10/1989 | Mura et al. | 369/283 X |

FOREIGN PATENT DOCUMENTS 60-120097  6/1985  Japan .

OTHER PUBLICATIONS

Dictionary of Practical Plastic Terminology K. K. Plastic Ej:, p. 225.

*Primary Examiner*—William M. Shoop, Jr.
*Assistant Examiner*—David Martin
*Attorney, Agent, or Firm*—Fitzpatrick, Cella, Harper & Scinto

[57] ABSTRACT

An optical recording medium, comprising a substrate and a recording layer covered on the outer surface with a protective member comprising a heat-shrinkable material subjected to heat shrinkage, a process for preparing the same and its optical recording and reproducing system.

16 Claims, 1 Drawing Sheet

OPTICAL RECORDING MEDIUM, PROCESS FOR PREPARING THE SAME AND ITS OPTICAL RECORDING AND REPRODUCING SYSTEM

This application is a continuation of application Ser. No. 216,020, filed Jul. 7, 1988, now abandoned.

BACKGROUND OF THE INVENTION

1. Field of the Invention

This invention relates to an optical recording medium which performs optically recording of information and its optical recording and reading system.

2. Related Background Art

In recent years, with the progress of information-oriented society, a large number of optical recording media and recording-reproducing devices of information have been proposed which perform recording, reproduction of optical information such as an optical disc, optical card, optical tape, etc. as the means for dealing with a diversity of information. In optical recording media, there has been known one in which the information formed into binary value can be detected by conversion into a change in reflectance or a change in intensity of the reflected light accompanied with the surface shape such as presence of a pit (concavity). Such optical recording medium is constituted of a preformat signal and a guide groove previously provided on a substrate according to the 2P method, compression molding, cast molding, etc., an amorphous thin film of a dye or pigment such as cyanine type or polymethine type, TeOx, chalcogen, etc. coated of vapor deposited thereon as the optical recording layer capable of recording and reproduction with light, and further a protective substrate for protection of the above optical recording layer laminated thereon, if desired.

Among such an optical recording media, optical card has dimensions of, for example, 85.4 mm×54.0 mm×0.76 mm and is excellent in portability. However, such an optical recording medium is liable to be flawed during carrying. Particularly, optical card, on account of its portability, is susceptible to formation of flaws, contamination, etc., whereby there ensue such problems that tracking is liable to cause slippage and that C/N ratio of the reproduced signal is lowered.

As the method for solving such problems, there have been proposed in the art an optical card which performs recording and reproduction with a protective sheet attached on the recording and reproducing light incident surface of an optical card, while peeling off the protective sheet corresponding to flaws and contamination as described in Japanese Patent Laid-open Application No. 60-120097 or prevention of flaws by providing a hard coat layer on the recording and reproducing light incident surface of the optical card. However, when the protective sheet is peeled off, there is the fear that the adhesive may be attached onto the surface of the optical card to negative affect recording and reproduction.

Also, when a tacky protective sheet is plastered, to maintain its tacky strength at a certain strength and to peel it off easily can be satisfied at the same time with difficulty, because both are antagonistic to each other.

Also, as for the hard coat layer, when a flaw is once presents which makes reproduction impossible, the information on the optical card can be completely reproduced with difficulty.

SUMMARY OF THE INVENTION

An object of the present invention is to provide an optical recording medium which can prevent flaws; contamination with a simple constitution and has remarkably reduced errors during recording and/or reproduction by solving the above problems of the prior art.

Another object of the present invention is to provide an optical recording-reading system of an optical recording medium, which can prevent flaws, contamination and reduce errors during recording and/or reproduction.

A further object of the present invention is to provide a method for preparing an optical recording medium, which can prevent flaws and contamination and reduce errors during recording and/or reproduction.

According one aspect of the present invention, there is provided an optical recording medium comprising an optical recording medium covered on the outer surface with a protective member comprising a heat-shrunk material subjected to heat shrinkage.

According to another aspect of the present invention, there is provided an optical recording-reproducing system of the present invention comprising performing information recording and/or reproduction on an optical recording medium covered with a protective member comprising a heat-shrinkable material after removal of said protective member prior to information recording and/or reproduction, and mounting said protective member after information recording and/or reproduction.

According to a further aspect of the present invention, there is provided a method for preparing the optical recording medium comprising covering the outer surface of an optical recording medium with a heat-shrinkable material and heating the protective member to bring said protective member into close contact with said optical recording medium.

In the present invention, since the optical recording medium is covered with a protective member comprising a heat-shrinkable material, there is no such migration of adhesive or tackifier to the optical recording medium as in the prior art examples as described above, but attachment and detachment can be easily done, and also with good contact with the optical recording medium. Therefore, outer dimensions are not substantially changed from the original dimensions of the optical recording medium without damaging portability, whereby errors during recording and/or reproduction due to flaws and contamination could be avoided.

DETAILED DESCRIPTION OF THE INVENTION

Figure 1:
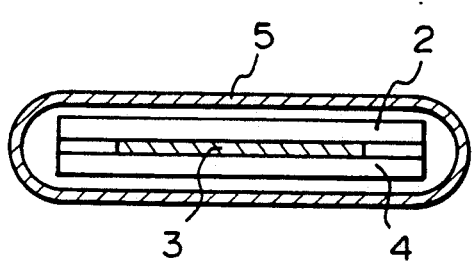
FIG. 1 is a schematic sectional view of an optical recording medium according to the present invention, FIG. 1(a) showing a sectional view of the state in which a protective member comprising a heat-shrinkable material is covered and FIG. 1(b) a sectional view of the state in which a protective member comprising a heat-shrinkable material is shrunk by heat to be covered on the optical recording medium in close contact therewith.
Figure 1:
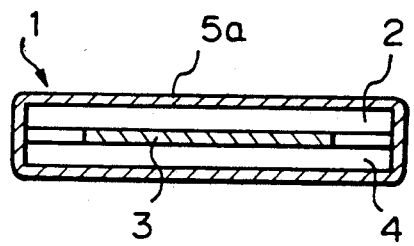

The present invention is described in detail below by referring to the drawings.

FIG. 1 shows an optical recording medium according to the present invention, FIG. 1(a) shows a sectional view of the state in which a protective member comprising a heat-shrinkable material is covered and FIG. 1(b) a sectional view of the state in which a protective member comprising a heat-shrinkable material is shrunk by heat to be covered on the optical recording medium in close contact therewith.

In FIG. 1, the optical recording medium 1 of the present invention comprises an optical recording medium comprising an optical recording layer 3 provided on a substrate 2 having a pregroove provided thereon and a protective layer 4 laminated optionally through an adhesive layer, having a protective member comprising a heat-shrinkable material on the outer surface thereof, followed by heating to thereby coat the heat-shrunk protective member 5a closely covered on the outer surface of the card.

As the protective member 5 comprising a heat-shrinkable material, those which can be shrunk in diamater by application of heat such as a heat-shrinkable tube, etc. or those which can be shrunk by application of heat such as heat-shrinkable sheet, etc., including those obtained by such method as stretching processing of materials such as polvinyl chloride, polyethylene, polypropene, polystyrene, polyvinylidene chloride, polyester, hydrochloric acid rubber, silicone resin, etc.

The thickness of the protective member covering the outer surface of the optical recording medium depends on the shrinkage of the heat-shrinkable material employed, but can be controlled generally within the range of 0.01 to 5 mm. Particularly, as the protective member of the optical recording medium, a thinner member with higher flaw resistance and abrasion resistance is preferred, and those with a thickness of 0.01 to 1 mm may be preferably employed.

The heat applied to the protective member comprising the above heat-shrinkable material may be preferably within the range which shrinks sufficiently the protective member comprising the heat-shrinkable material and does not deleteriously affect the optical recording medium itself, for example, 50° C. to 200° C., particularly preferably 80° C. to 170° C.

The shrinkage of the heat-shrinkable material should be preferably about 0.8 to 0.9 when the size before heating is equal to 1.

Also, by selecting the material for the heat-shrinkable material, various functions such as flame retardancy, solvent resistance, electroconductivity, oil resistance, thermal conductivity can be provided to give extremely preferable effects as the protective member for the optical recording medium.

When the protective member is transparent, the information of the appearing on the back surface of the optical recording medium and face photography can be read.

On the other hand, when an opaque protective member is used, light resistance of the optical recording layer can be improved, whereby various kinds of printing become possible on the surface of the protective member for information display or publicity.

In the following, the optical recording-reproducing system and the optical recording and/or reproducing device are to be described.

The optical recording medium of the present invention effects information recording and/or reproduction by performing information recording and/or reproduction on an optical recording medium covered with a protective member comprising a heat-shrinkable material after removal of said protective member prior to information recording and/or reproduction, and mounting a new protective member after information recording and/or reproduction.

Figure 2:
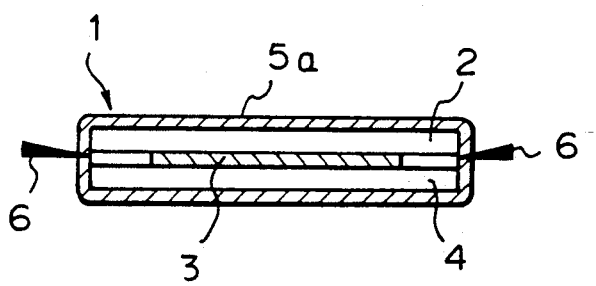
FIG. 2 is an illustration of the method for cutting the protective member covered in close contact with the optical recording medium.
Figure 3:
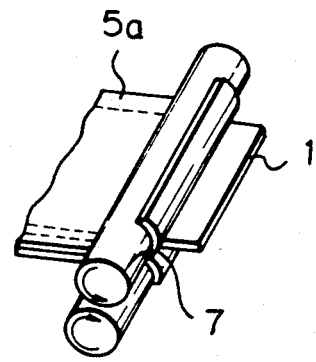
FIG. 3 is an illustration of the method for removing the protective member covered in close contact with the optical recording medium.

As the method for removing the protective member, for example, as shown in FIG. 2, it can be removed by cutting the side surface or the end surface with a cutter 6 and winding up with tacky rollers 7 as shown in FIG. 3.

As the method for mounting the protective member, the protective member comprising a heat-shrinkable material can be previously formed into a bag or tube of greater size than the optical recording medium, and an optical recording medium can be placed into this, followed by shrinkage by heating by means of hot air or hot rollers to effect mounting by close contact of the protective member with the optical recording member.

When the protective member comprising a heat-shrinkable material to be covered on the optical recording medium in the present invention is transparent, recording and reproduction of information may be conducted without removing the protective member.

Further, in the present invention, without providing the protective substrate on the optical recording layer formed on the substrate, a protective member comprising a heat-shrinkable material may be also covered thereon. In this case, due to the absence of the protective substrate which inhibits formation of pits, recording sensitivity is improved.

The following effects can be obtained from the optical recording medium, its recording and reproducing method and the method for production thereof of the present invention as described above.

(1) Since the protective member comprises a heat-shrinkable material without use of an adhesive, etc., attachment to and detachment from the optical recording medium can be easily done, and also there is no residual adhesive on the optical recording medium surface after the protective member is peeled off, whereby errors during recording and reproduction can be prevented.

(2) Since the protective member is covered in close contact with the optical recording medium through its tension, it will not be peeled off unless the protective member is cut open, and also since it is closely contacted with the optical recording medium, there is substantially no change in size of the optical recording medium to also provide good portability.

The present invention is described in more detail by referring to Example.

EXAMPLE 1

As the optical recording medium was employed one obtained by coating a polymethine type dye with a thickness of $0.1\mu$ as the optical recording layer on a transparent acrylic resin substrate equipped with a pregroove of 85 mm×54 mm×0.4 mm, followed by lamination of a black acrylic resin plate of 85 mm×54 mm×0.3 mm.

The optical recording medium was covered with a 1 mm thick heat-shrinkable tube (St-190HT, produced by Shinetsu Silicon) and subjected to heat shrinkage by heating with hot air (ca. 170° C.) by a handy dryer to be covered with the protective member closely contacted on the outer surface.

The optical recording medium covered with the protective member and the optical medium not covered were handled under ordinary circumstances in a pocket for one month, and then the protective member was removed and the information previously recorded on both were reproduced for comparison with respect to the error rate of the card due to flaws and contamination. As the result, when used without covering with the protective member, the value was extremely bad as $3 \times 10^{-1}$, while when used with the protective member of the present invention, the value was substantially the same as the initial value of $1 \times 10^{-4}$.

What is claimed is:

1. An optical recording medium, comprising:
 a substrate and a recording layer, the outer surface of said optical recording medium being covered with a protective member comprising a stretching-processed heat-shrinkable material that was subjected to heat shrinkage.

2. An optical recording medium according to claim 1, wherein said protective member has a thickness of 0.01 mm to 5 mm.

3. An optical recording medium according to claim 2, wherein said protective member has a thickness of 0.01 mm to 1 mm.

4. An optical recording medium according to claim 1, wherein said protective member is heated at a temperature of 50° C. to 200° C.

5. An optical recording medium according to claim 4, wherein said protective member is heated at a temperature of 80° C. to 170° C.

6. An optical recording medium according to claim 1, wherein said protective member comprises a heat-shrinkable sheet obtained by stretching processing of at least one material selected from the group consisting of polyvinyl chloride, polyethylene, polypropylene, polystyrene, polyvinylidene chloride, polyester, hydrochloric acid rubber, and silicone resin.

7. An optical recording medium according to claim 1, wherein a protective substrate is provided on the recording layer of said optical recording medium.

8. An optical recording medium according to claim 1, wherein said optical recording medium is an optical card.

9. A method for mounting a protective member on an optical recording medium which comprises the steps of:
 selecting an optical recording medium comprising a substrate and a recording layer;
 selecting a stretching-processed heat-shrinkable material;
 covering the outer surface of said optical recording medium with said heat-shrinkable material; and
 heating said protective member to bring said protective member into close contact with said optical recording medium.

10. A method for mounting a protective member of an optical recording medium according to claim 9, wherein the heating temperature is 50° C. to 200° C.

11. A method for mounting a protective member of an optical recording medium according to claim 10, wherein the heating temperature is 80° C. to 170° C.

12. A method for mounting a protective member of an optical recording medium according to claim 9, wherein said optical recording medium is an optical card.

13. A process for optical recording or reproducing, which comprises the steps of:
 selecting an optical recording medium comprising a substrate and a recording layer and covered with a protective member comprising a stretching-processed heat-shrinkable material that has been heat-shrunk;
 removing said protective member;
 conducting information recording or reproduction on said optical recording medium without said protective member;
 mounting a stretching-processed heat-shrinkable protective member on said optical recording medium after said information recording or reproduction; and
 heating the protective member to bring said protective member into close contact with said optical recording medium.

14. An optical recording and reproducing process according to claim 13, wherein said recording medium is an optical card.

15. A method for mounting a protective member of an optical recording medium according to claim 9, wherein the stretching-processed heat-shrinkable material has a rate of shrinkage of 0.8 to 0.9.

16. An optical recording medium, comprising:
 a substrate and a recording layer, an outer surface of said optical recording medium being covered with a protective member comprising a stretching-processed heat-shrinkable material that was subjected to heat-shrinkage, and said protective member being fixed on the outer surface of said optical recording medium without adhesives by heat-shrinking the protective member.

* * * * *

UNITED STATES PATENT AND TRADEMARK OFFICE
CERTIFICATE OF CORRECTION

PATENT NO.  :  5,249,176           Page 1 of 2
DATED       :  September 28, 1993
INVENTOR(S) :  Imataki It is certified that error appears in the above-identified patent and that said Letters Patent is hereby corrected as shown below:

On title page, item

[56] References Cited

FOREIGN PATENT DOCUMENTS

Insert:

--0120514  10/84   European Pat. Off.
  0105374   4/84   European Pat. Off.
  0089874   9/83   European Pat. Off.
  0126161  11/84   European Pat. Off.--.

COLUMN 1:

Line 32, "of" should read --or--;
Line 37, "an" should be deleted and "optical" (second occurrence) should read --an optical--;
Line 40, "an" should be deleted;
Line 41, "optical" should read --an optical--;
Line 58, "negative" should read --negatively--;
Line 66, "presents" should read --present--; and
Line 68, "produced" should read --produced only--.

COLUMN 2:

Line 4, "flaws;" should read --flaws and--.

COLUMN 3:

Line 61, "of the" (first occurrence) should be deleted.

UNITED STATES PATENT AND TRADEMARK OFFICE
CERTIFICATE OF CORRECTION

PATENT NO. : 5,249,176
DATED : September 28, 1993
INVENTOR(S) : Imataki

It is certified that error appears in the above-identified patent and that said Letters Patent is hereby corrected as shown below:

COLUMN 5:

Line 4, "handy" should be deleted.

COLUMN 6:

Line 10, "of" should read --on--;
Line 13, "of" should read --on--;
Line 16, "of" should read --on--; and
Line 41, "of" should read --on--.

Signed and Sealed this

Fifth Day of July, 1994

Attest:

BRUCE LEHMAN

Attesting Officer          Commissioner of Patents and Trademarks